Nov. 18, 1958 W. C. VAN CLIEF, JR 2,860,921
METHOD AND APPARATUS FOR FORMING ROTARY BRUSH
Filed Oct. 11, 1954 6 Sheets-Sheet 1

INVENTOR.
WILLIAM C. VAN CLIEF JR
BY
Oscar L. Spencer
ATTORNEY

Nov. 18, 1958  W. C. VAN CLIEF, JR  2,860,921
METHOD AND APPARATUS FOR FORMING ROTARY BRUSH
Filed Oct. 11, 1954  6 Sheets-Sheet 3

INVENTOR
WILLIAM C. VAN CLIEF, JR

Oscar L. Spencer
ATTORNEY

Nov. 18, 1958 W. C. VAN CLIEF, JR 2,860,921
METHOD AND APPARATUS FOR FORMING ROTARY BRUSH
Filed Oct. 11, 1954 6 Sheets-Sheet 4

INVENTOR
WILLIAM C. VAN CLIEF, JR

Oscar L. Spencer
ATTORNEY

Nov. 18, 1958 W. C. VAN CLIEF, JR 2,860,921
METHOD AND APPARATUS FOR FORMING ROTARY BRUSH
Filed Oct. 11, 1954 6 Sheets-Sheet 5

INVENTOR
WILLIAM C. VAN CLIEF, JR
Oscar A. Mercer
ATTORNEY

Nov. 18, 1958  W. C. VAN CLIEF, JR  2,860,921
METHOD AND APPARATUS FOR FORMING ROTARY BRUSH
Filed Oct. 11, 1954  6 Sheets-Sheet 6
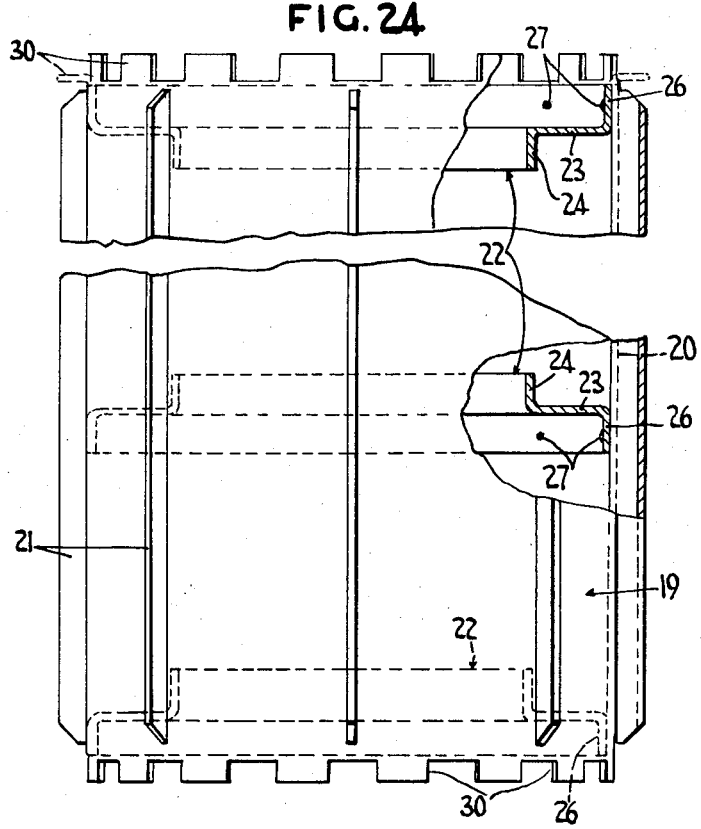
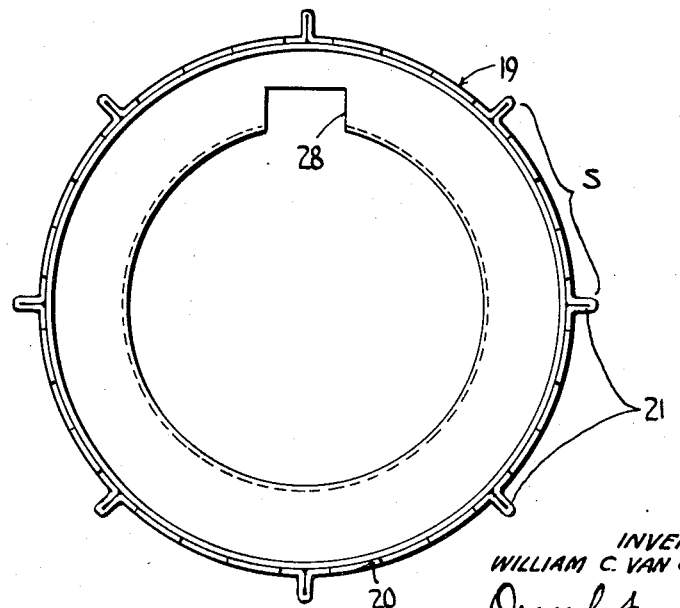
INVENTOR
WILLIAM C. VAN CLIEF JR
Oscar L. Spencer
ATTORNEY

United States Patent Office 2,860,921
Patented Nov. 18, 1958

2,860,921

METHOD AND APPARATUS FOR FORMING ROTARY BRUSH

William C. Van Clief, Jr., Baltimore, Md., assignor to Pittsburgh Plate Glass Company, Allegheny County, Pa., a corporation of Pennsylvania Application October 11, 1954, Serial No. 461,303

13 Claims. (Cl. 300—21)

This invention relates to a method of, and an apparatus for forming brushes and it has particular relation to a method of, and an apparatus for forming rotary cylindrical brushes having tightly compacted radially extending bristles and being of the type employed in such heavy duty operations as the scrubbing of sheet metals, e. g. iron or steel.

In a copending application by the present inventor filed of even date and entitled "Brush of High Bristle Density" there is disclosed a brush structure comprising a tubular core having radially extending longitudinal fins and a series of laminations assembled upon this core, each lamination comprising a bristle retaining ring of a diameter to fit over the radial fins and having double ended bristles doubled thereabout. The laminations on the core are maintained from axial displacement by means of annular end rings mounted on the core. Peripheral creeping of the retaining rings and the bristles thereupon, is obviated by the longitudinally extending fins which are disposed to extend up into the looped, waist portions of the bristles. Brushes so constructed, have an exceptionally high density of bristles per unit of area of brush surface and are of exceptional stiffness. Also they resist disintegration through failure of the bristles in a small area and subsequent progressive chain disintegration by reason of the fact that localized damage or loss of bristles leaves the contiguous bristles unsupported and they therefore tend quickly to become loosened or otherwise to fail.

The present invention includes the provision of a relatively simple and efficient process of, and apparatus for assembling brushes of the foregoing type by application of which the brushes can be assembled quite rapidly and with but small expenditure of manual labor.

Broadly stated, the mechanism employed in the practice of this invention comprises a clamping fixture for holding a tubular core such as is employed in the fabrication of the above described brush. The invention further comprises means to hold an end of a sheaf-like bunch or bundle of double ended bristles in coaxial contiguity to an end of the core and means simultaneously to move the bundle coaxially toward the core and replicately to bend the ends outwardly to loop them about a retaining ring, thus forming a lamination which is then threaded on the core.

For a better understanding of the principles of the invention reference may now be had to the accompanying drawings in which like numerals refer to like parts throughout.

In the drawings:

Fig. 24 is a view partially in section and partially in elevation of a preferred brush core; and Fig. 25 is a plan of the core disclosed in Fig. 24.

Figure 1:
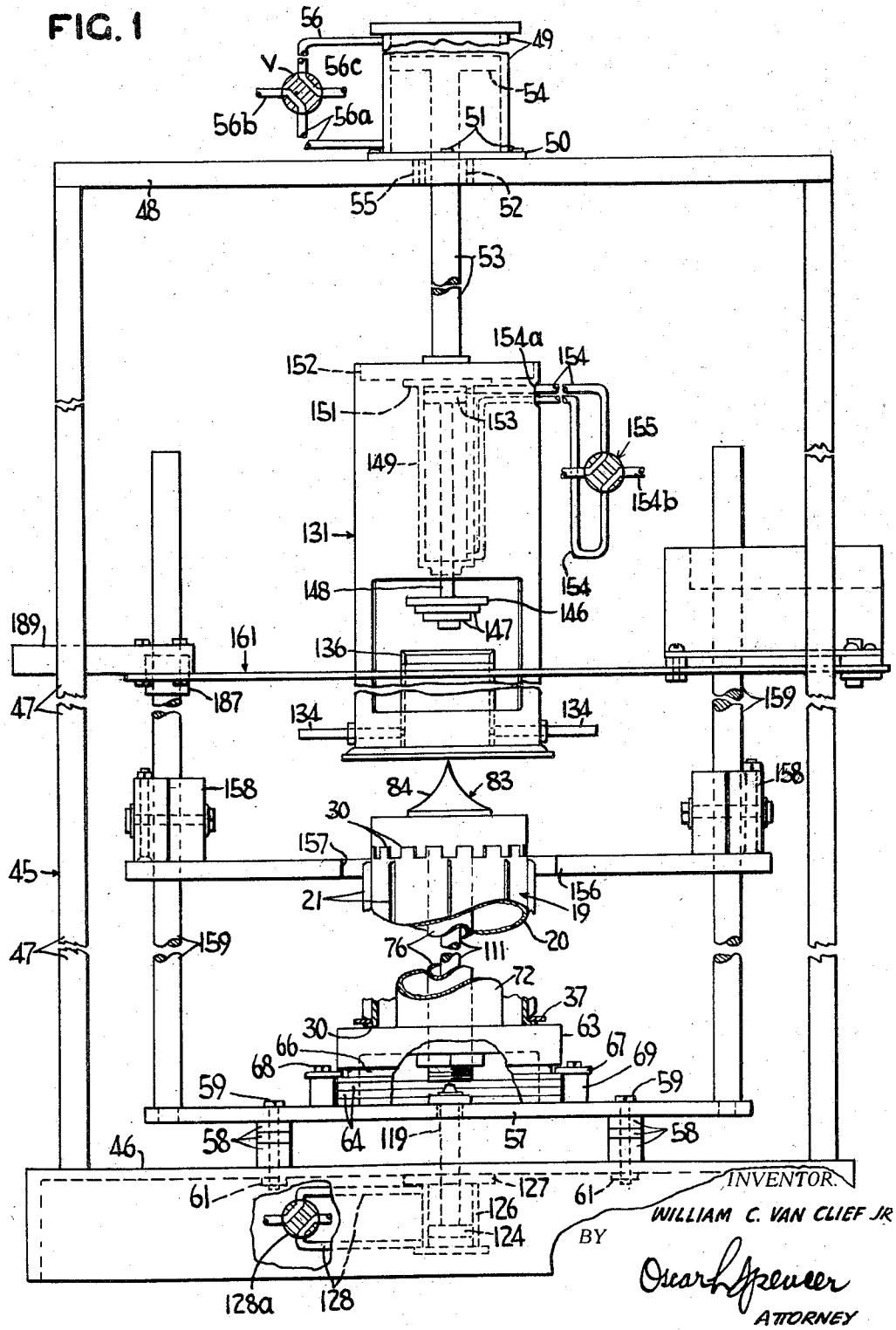
Fig. 1 is an assembly view showing in a general way the association of the several important elements of the mechanism employed in the practice of the invention.

A tubular core suitable for use in forming brushes upon the apparatus constituting the subject matter of this application will first be described. This core, as illustrated in Fig. 24 is indicated generally by the numeral 19. It comprises sidewalls 20 of sheet metal with radially extending longitudinal fins 21 which as illustrated, are formed by replicately folding narrow sections of the metal constituting the tubular walls 20. Any number of fins desired may be provided, but for purposes of illustration, eight are shown in the drawings. Within the core are disposed a plurality of bushings 22 each of which comprises an annular web portion 23 and edge flanges 24 and 26 extending coaxially with respect to the core but in opposite directions with respect to each other. The outer of the flanges 26 may be secured in position in the tubular core by appropriate means as for example by spot welding at such points as are indicated at 27. The intervals between the points of welding may be spaced in accordance with the strength of the bond required between the bushing and the wall to which it is attached. As many bushings as may be desired, dependent upon the length of the brush, the stress to which it is to be subjected and such like factors, may be employed. A bushing, of course, should be included at or near each end of the brush core.

As illustrated in Fig. 25 of the drawings, bushings are provided with keyways 28 by means of which they can be locked against rotation upon a mandrel by means of a suitable key (not shown). In some instances, it may be preferable to lock the brush against rotation upon the mandrel by employing bushings having openings of non-circular shape (e. g. and octagonal), fitting on a mandrel of similar section. When the structure is so formed, the use of keyways is not required.

As shown, the ends of the tube 19 are formed with spaced notches or tabs 30 constituting castellations, in the formation of which, sufficient metal should be cut out to assure that the castellations of contiguous units will intermesh with each other, thus facilitating the close positioning of the ends of contiguous units, should a plurality of units be employed in a gang upon a common shaft. Also such intermeshing provides a drive for intermediate brushes should it be desired to drive several units upon a cylindrical shaft from a positive drive coupling upon the end unit or units.

Figure 21:
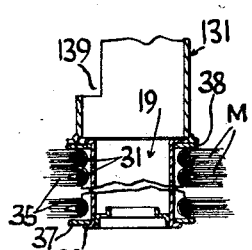
Figure 22:
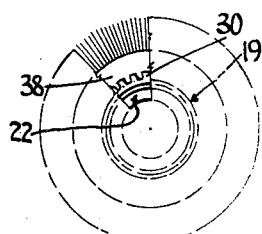
Fig. 22 is a plan view of a brush constructed by the method and apparatus herein disclosed.
Figure 23:
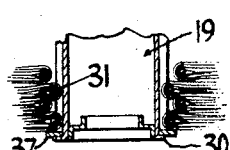
Fig. 23 is a fragmentary sectional view of a modification of the brush shown in Fig. 22.

A completed brush assembled of annular laminations M upon the core of Fig. 24 is illustrated in Figs. 21 and 22. Each of these laminations includes a retaining ring 31 for replicate or doubled bristles 35 of tampico or other bristle-like material. The ring may be flattened or annular, but for purposes of illustration is shown as formed of a round wire of steel or other suitable metal, the ends of the wire being welded or otherwise secured together to provide an endless band of considerable mechanical strength and being free of sharp angles or raw edges which might tend to chafe or otherwise to cut the bristles at the points of contact. The rings 31 preferably are of a diameter approximately corresponding to the diameter of the circle of the tips of the fins 21. They may be slightly larger in diameter, but in any event, they should not be so large as to allow the laminations to be unduly loose upon the core structure. The double ended bristles indicated at 35 are looped about the rings with the looped mid portions disposed in the space S between the fins 21 in such manner that each lamination is locked from peripheral creeping or rotation upon the core. The fins also act to divide the laminations M into segments, thereby preventing the disintegration of the entire lamination around its perimeter, in event that loss of a few bristles should occur in a small area between two fins.

The laminations, it will be observed, need not include any discs or annular rings or channels between contiguous units, thus reducing the total amount of metal required to secure the brush bristles in position and thereby attaining a very high density of brush bristles per unit of surface area. The laminations are also free to move along the core during assembling operations and therefore can be compacted to maximum extent by hydraulic pressure as hereinafter described.

The laminations compacted as tightly as practicable upon the tubular core, are maintained in position thereupon by means of annular end rings 37 and 38, which are seated against the ends of the fins 21 and retained in position upon the core, by bending or flaring the castellations 30 radially outwardly to provide the finished structure.

Mechanism to assemble the brushes upon the cores as illustrated in Fig. 1 of the drawings comprises a press, e. g. a hydraulic press 45 having a base 46 with upright rods or standards 47 at each corner thereof and being provided at their upper extremities with a fixed platform 48 having a hydraulic cylinder 49 secured thereupon by mounting means such as a bottom flange 50 secured by bolts 51 threaded into, or otherwise secured in the platform 48. The lower extremity of the cylinder is formed with a stuffing box 52 providing a fluid tight seal about a piston rod 53 which at its upper end carries a piston head 54 operating in the cylinder 49. The stuffing box 52, it is to be observed, is disposed in an opening 55 in the top plate 48. Conduits 56 and 56a provide means for admitting fluid to the cylinder to actuate the piston therein. The conduits may also be provided with three-way valve V by means of which pressure from line 56b can be admitted to either end of the cylinder or can be exhausted through line 56c, thus actuating the piston 54 up or down or holding it still, as required. The valve may be automatically or manually controlled at desired stages.

Base 46 is equipped with suitable means for holding and centering a core structure 19. In the embodiment illustrated in the drawing, such means comprises a plate 57 which is supported at appropriate intervals by lengths of tubing 58 through which extend securing bolts 59 which at their lower ends are provided with nuts 61 and at their upper ends have conventional heads threaded thereupon. A series of different lengths of tubes and bolts may be provided, to admit of raising or lowering the platform to facilitate forming different lengths of brushes.

Figure 2:
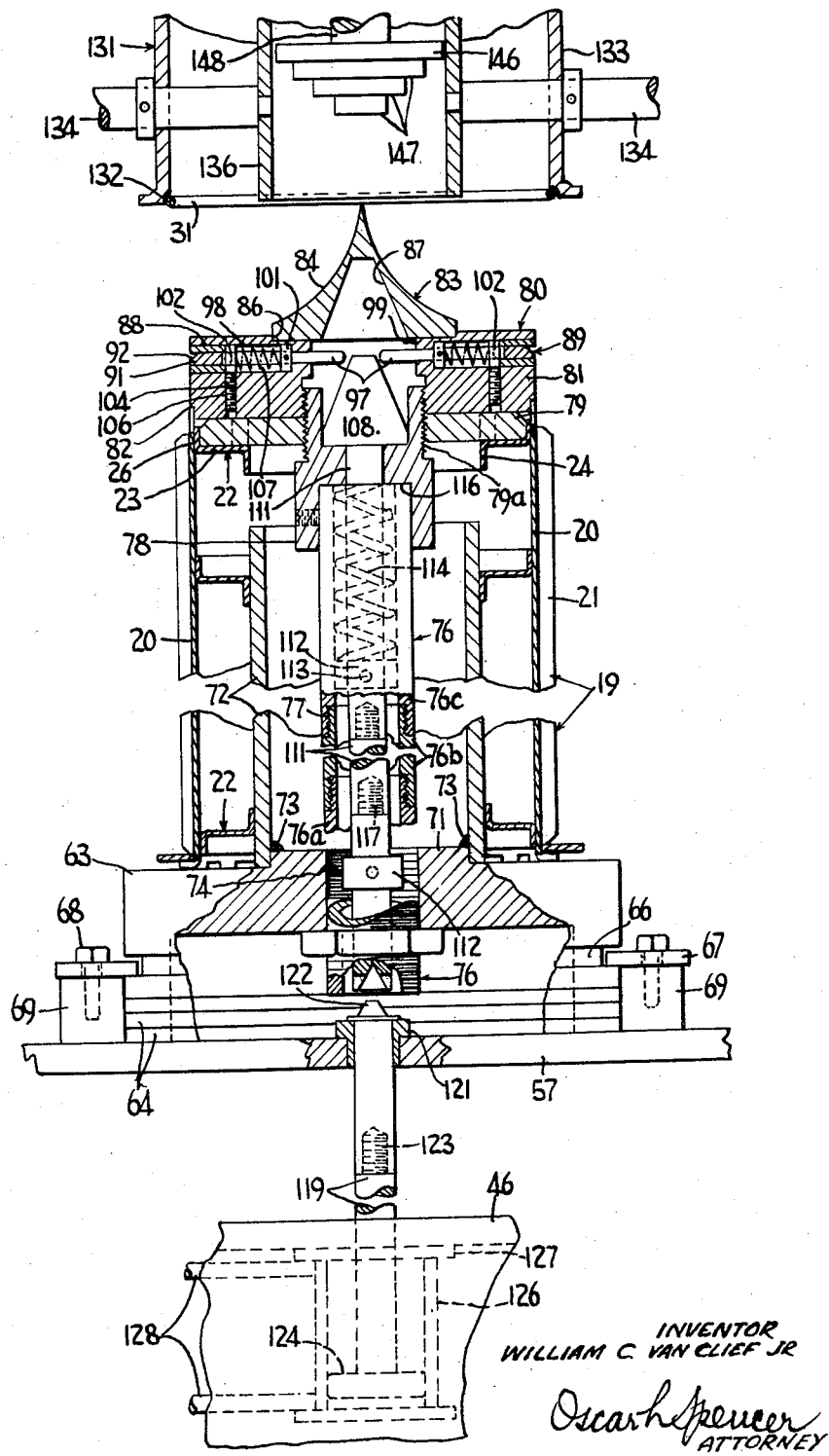
Fig. 2 is a fragmentary sectional view showing on a larger scale certain of the elements illustrated in Fig. 1.

The construction also includes a pedestal 63 having a series of resilient rubber cushioning rings 64 best shown in Fig. 2, supporting it on the plate 57. The pedestal 63 is provided with a peripherally extending groove 66 adapted to receive clamping lugs 67, which lugs fit loosely in the groove and are held in position upon the ring 63 by means of stud screws 68 that are threaded into bosses 69 forming rigid portions of the plate 57.

The rings 64 being resilient, urge the base or pedestal 63 upwardly so that the lower face of groove 66 is firmly pressed against lugs 67, thus maintaining the base in horizontal position. It will also be apparent that in event that should the pedestal be forced out of level during the operations subsequently to be described it will automatically be returned by the resiliency of the rings 64, when the unbalanced force is relaxed.

Circular boss 71 is formed upon the upper face of the pedestal 63 and fits into the lower end of a tube 72 which is secured to the pedestal by welding as indicated at 73, or by other suitable means. The tube fits closely within the bushings 22 of a brush core 19 whereby the latter is accurately centered in the press while a brush is being assembled.

A vertical hole is bored in the center of the top of the pedestal 63 and is tapped as is indicated at 74 to receive the lower extremity of a tubular column 76 which as shown, is formed of a plurality of sections for purposes of adapting the mounting to hold different lengths of cores 19. The column is indicated as comprising three sections 76a, 76b and 76c which are secured together by screw threaded connections 77.

The upper extremity of the column 76 is provided with a head fitting 78 which is threaded as indicated at 79a to receive a similarly threaded hold down disc 79, of a size to fit within the inner perimeter of the flange 26 of bushing 22 so that when the disc is screwed down upon an end bushing of the core structure, the latter is firmly clasped upon the pedestal 63 preparatory to the assembly and positioning of the brush laminations.

A stock distributor head 80 comprising short cylinder or thick disc 81 is also threaded upon the head 78 and preferably is formed with a shoulder indicated at 82 which rests upon, or contiguous to the upper edge of the tube 19. A brush bristle distributor element 83 of cusped, conoidal outline, but with the surface generating elements thereof concavely curved as indicated at 84 is seated in a circular recess 86 in the top of the distributor head. The element is formed with cavity 87, the purpose of which will subsequently be explained.

Figure 7:
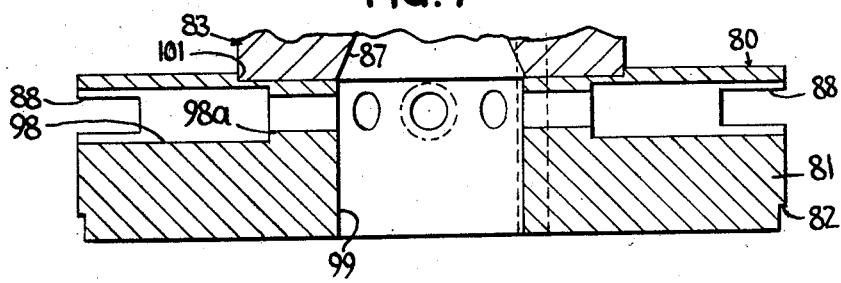
Fig. 7 is a detail sectional view of certain elements of a stock distributor head.
Figure 8:
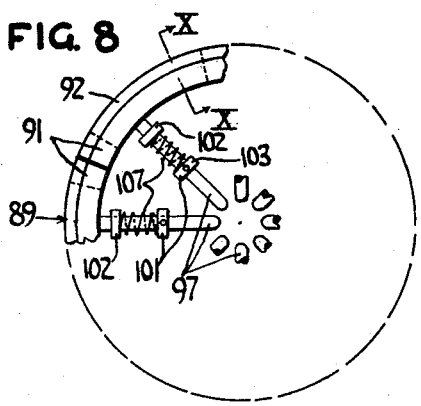
Fig. 8 is a detail view of a segmental ring for partially folding the bristles.
Figure 9:
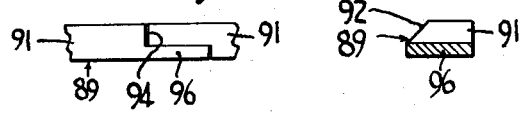
Fig. 9 is a fragmentary detail of the joint between segments of the ring of Fig. 8.
Figure 10:
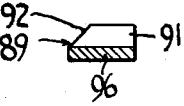
Fig. 10 is a section of the ring along the line X—X of Fig. 8.
Figure 15:
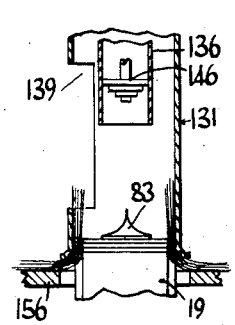
Figure 16:
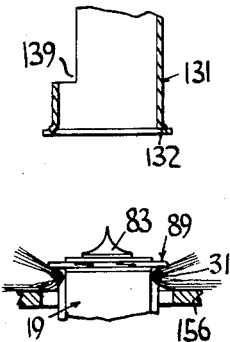

For purposes of initiating outward movement of the upper ends of the brush bristles, as shown in Fig. 16, after the lower ends have been bent, as shown in Fig. 15, to produce the fold therein about the retaining ring 31, a groove 88 shown in Fig. 7 is formed in the plate 81 somewhat below the top thereof and is designed to receive an expandable folder ring 89 which as shown, comprises a series of segments 91 (Figs. 8–10). These segments are substantially identical and for purposes of illustration, they are shown as being spaced 45° apart, though obviously this spacing might be increased or decreased at will.

Each segment is of approximately the section illustrated in Fig. 10 and includes a beveled shoulder 92 designed to facilitate the smooth and uniform outward flaring of the upper extremities of a stock, such as tampico employed in the formation of the brushes. To prevent stock from springing back into the spaces between the segments as the latter are expanded, as shown in Fig. 9, a rabbet 94 is formed in one end of each segment, while a corresponding tongue 96 is provided upon the contiguous end of the adjacent segment. The rabbets and tongues interfit so that as the overlapping segments move outwardly in a folding, sliding operation, a continuous perimeter is presented to the bristles.

The segments are supported upon radial push rods 97 which extend through holes 98 radially bored but stepped as indicated at 98a in the plate 81 into an axial recess 99 formed in the latter.

For purposes of retaining the segments in normally retracted position, a pair of collars 101 and 102 are provided upon each of the rods. The first collar is rigidly secured against longitudinal displacement upon the rod by means of a set screw 103. The other collar 102, on the other hand, is slidably disposed with respect to the rod upon which it is disposed and is rigidly secured from movement within the bore 98 by means of a set screw 104 which is threaded upwardly through the plate 81 as indicated at 106. A helical spring 107 under compression, is disposed upon the rod 97 between the two collars and exerts resilient pressure against the collar 101 actuating the latter radially inwardly to contract the segmental ring.

For purposes of actuating the rods 97, together with their attendant segments, radially outwardly at the desired stage of operation, a vertically movable conical cam member 108 is provided in recess 99 in the head 78. This cam member is supported upon the upper end of an actuating rod 111 which extends downwardly through tubular column 76 and is mounted for sliding movement in the latter by means of guide rings or collars 112 which are firmly secured on the rod as for example by pins 113 or other appropriate means. The upper of these collars provides a seating surface for a helical spring 114 which is compressed between the collar and the upper end surface 116 within the recess in the fitting 78. The spring, thus tends normally to actuate the cam member 108 out of engagement with the ends of the rods 97. It will be observed that the rod 111, like the column 76, is formed of a plurality of sections which have appropriate screw joints as indicated at 117. A number of sections of different lengths admits of accommodating the apparatus to cores 19 of different lengths.

Means to actuate rod 111 and cam element 108 upwardly for purposes of operating the rods 97, comprises a push rod 119 which operates in a guide 121 disposed in the plate 57. The upper end of rod 119 has a conical surface 122 which approximately mates with a similar surface formed in the lower end of the rod 111. Rod 119 may be formed of sections of any desired number which are joined together, as indicated at 123 by a screw joint. If platform 57 is raised or lowered different lengths of sections may be used. The rod also extends downwardly through an opening in the face plate of the pedestal 46 and at its lower extremity, it is provided with a piston head 124 operating in a cylinder 126 which is fastened by a flange 127 to the under surface of the pedestal. Conduits 128, having manually operable valve 128a extending into the cylinder, provide means for the admission of fluid under compression into the cylinder in order to actuate the piston head, together with the rod 119 upwardly and thus through the train of rods, cam 108, and rods 97 to actuate the segmental ring element 91 outwardly for purposes of outwardly flexing the upper extremities of the brush bristles. Cavity 87 in deflector cone 83 receives cone 108 as it moves upwardly.

Means to supply bristle stock, such as bunches of tampico or similar bristle material, and otherwise to manipulate the stock, as shown in Fig. 1 of the drawings, comprises a tubular ram head 131 which is mounted upon the lower extremity of the rod 53 and is of an internal diameter to pass coaxially over a brush core 19 mounted upon the pedestal 63. The ram is formed with an internal rabbet 132 (see Fig. 2) in which a retainer ring 31 for the brush bristle material may be seated preliminarily to its application to a brush lamination.

Figure 6:
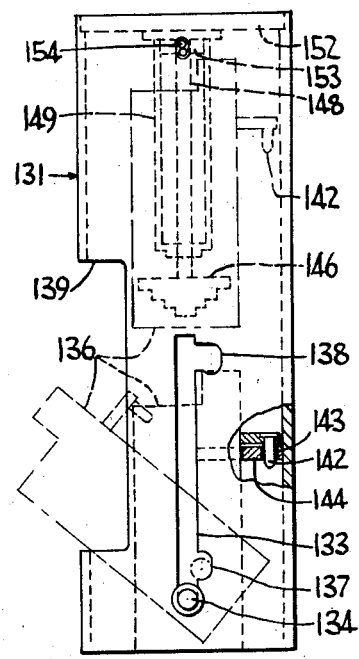
Fig. 6 is a side view of the ram shown in Fig. 5.

The ram head, as shown in Fig. 6, is also provided with a pair of diametrically opposed vertical slots 133 through which extend handle elements 134 of a stock tube 136 which can be moved up or down manually, or by other means within the ram head. Slot 133 as shown, is provided with short branch slots 137 and 138 in which the handles 134 can be seated at appropriate stages in operation in order to maintain the tube 136 in desired position. The stock tube as shown, is of a bore to receive a bundle of bristle material sufficient to form a laminar section M. To facilitate the insertion of the material, the ram head is formed with a receiving opening 139 and the upper edge of the tube 136 may be beveled as indicated at 140.

Opening 139 in the side of the ram affords access to the tube 136 and also affords access to the folding head 80 so that the latter can be lifted out when the ram is down in the position shown in Fig. 21. Charging of the tube 136 with stock can be effected by slightly lifting the tube 136 by the projecting handles 134 and swinging the latter back into the appropriate notch or branch slot 137 and allowing the top of the tube 136 to swing forwardly through opening 139 formed in the front of the ram head. A bunch of stock of appropriate size can then readily be pushed into the tube 136 and is held therewithin by reason of frictional engagement due to the springiness of the stock. The charged tube 136 is then returned to its initial position with the handles 134 in the bottoms of the slots 133 and in so returning the tube 136, it is desirable to lock the latter in vertical position which can be accomplished by suitable means, as for example by means of a hook 142 on the wall of the tube 136 which drops into opening 143 in a peripherally extending rib 144 in the back portion of the ram as the tube 136 is vertically lowered. This rib may be formed integrally with the interior of the ram or it may be secured by suitable fastening devices such as screws indicated at 145.

Means to force the stock downwardly through the tube 136 against the conical deflector or folder element 83, comprises a ram head 146 which as shown in the drawings has a stepped conical lower surface 147. Since considerable force is often required to force the bristle stock such as tampico out of the tube 136 and to flare the lower extremities of the stock outwardly against the folder element 83, the head 146 preferably is attached to the lower extremity of a vertical piston rod 148 which at its upper extremity extends into a cylinder 149 attached by flanges 151 to the top 152 of the tubular ram. Within the cylinder, rod 148 is attached to a piston head 153 which is actuated by compressed fluid, such as compressed air, admitted to the cylinder through an appropriate flexible hose connection such as the connection 154 that extends outwardly through an appropriate opening 154a in the wall of the ram head to air line 154b and is provided with a three-way valve 155.

Figure 11:
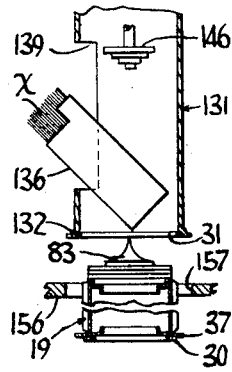
Figs. 11 through 21 are diagrammatical views illustrating the several stages involved in forming a brush upon a core.

When it is desired to form a lamination in the assembly of a brush, the stock tube 136 is charged with a bunch X of bristle material while tilted as shown in Figs. 6 and 11, and with ram 131 in elevated position. The tube is then swung back to vertical position while handles 134 are dropped into the bottoms of slots 133 and hook 142 is dropped into hole 143 to hold it steady and the ram 131 is lowered to a position near the tip of the flaring or folding element 83, which constitutes means axially to pierce the bunch and thus to initiate their outward movement. At this stage, a retainer ring 31 for the bristle material may also be disposed in the rabbet 132. To assure that the ring is retained in the groove, during preliminary operations, it may be slightly distorted to oval shape. When it is pressed into the groove, its own springiness will then hold it in place until it is engaged by the bristle stock, as hereinafter described. The piston rod 148 is now actuated by admission of fluid to the cylinder 149 forcing the lower ends of the stock out of the tube, axially to pierce the bundle and pushing the tips against the curved, conical surface of the member 83 thus causing the ends of the bristles to be deflected laterally. For purposes of receiving the outer portions of the bristles and holding them in a desired plane as they are expelled, a table or platform 156 is provided. This table is formed with an opening 157 of a size to permit the table to pass down over the core structure 19 and ring 37 and pedestal 63 already described and is frictionally held at any desired elevation by means of split collar 158 upon guide rods 159. Usually this table or platform is sufficiently firmly held to permit the bristles to be outwardly radially flared by pressure exerted above by the head 146, but the friction preferably is not so great but that the table can be forced downwardly along the guide rods by the application of pressure exerted from the tubular ram 131 when the latter is lowered to the proper level to engage the extremities of the brush bristle stock as the ends thereof are outwardly deflected on the table.

Figure 3:
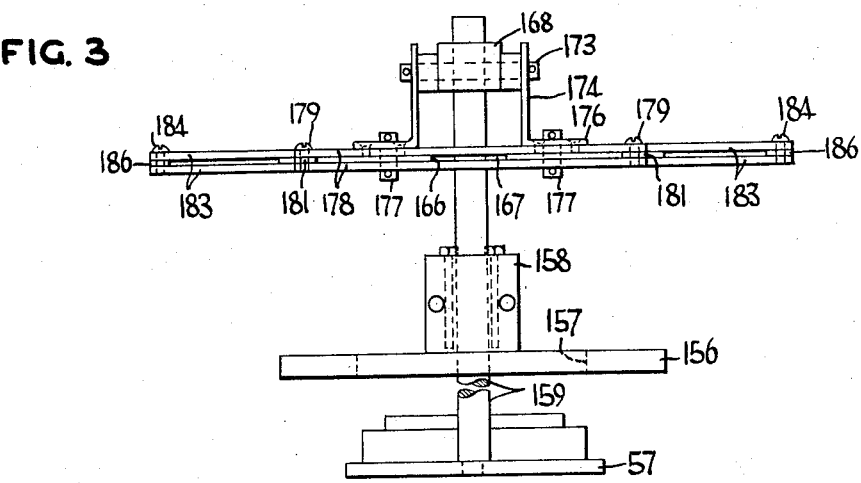
Fig. 3 is an elevational view showing a sub-assembly on a larger scale of certain elements of the mechanism.
Figure 4:
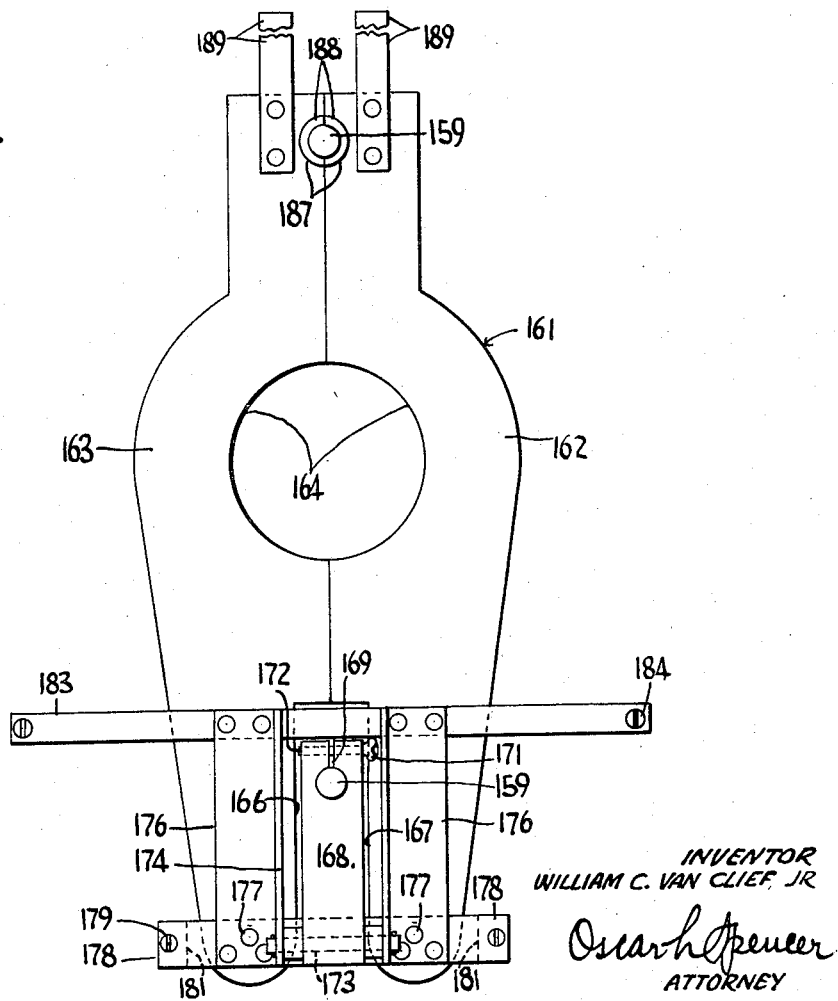
Fig. 4 is a plan view of a bristle clamping device suitable for use in the practice of the invention.
Figure 5:
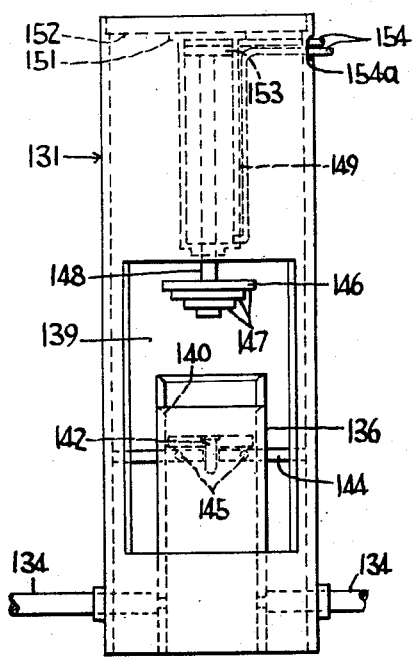
Fig. 5 is an elevational view of a tubular ram which is adapted to be hydraulically actuated for purposes of clamping the bristles in a laminate and for compacting the laminates upon the brush core structure.

For purposes of further clamping the folded ends of the bristles upon the platform 156 when ram 131 is retracted and for purposes of providing a deflector and support for the ends of the bristles as succeeding laminations are formed on the one or ones below, a split hold down platform device 161 has been provided. The device comprises symmetrical right and left plates 162 and 163 (Figs. 3 and 4) formed of plywood, sheet metal, or other appropriate material. The halves are formed intermediate of their ends with semi-circular notches 164 which are matched to provide a circular opening of a diameter somewhat exceeding that of the tubular ram head 131 but being sufficiently restricted to permit the halves 162 and 163 to engage the projecting ends of the bristle upon the platform 156.

At one end, the halves are formed with rectangular notches 166 and 167 and these notches are matched to provide a slot straddling one of the uprights 159. The latter is provided with a vertically slidable arm 168 split as indicated at 169 to permit variation of the frictional engagement with the rod by actuation of a nut 171 upon a through bolt 172. The rear portion of the arm 168 is bored to receive a pintle pin 173 the extremities of which are pivoted in openings in the vertical flanges 174 of angle irons having a horizontal flange 176. At the rearmost ends, the flanges 176 are bored to receive pintles 177 upon which the halves of the hold-down device are pivoted so that the latter may be swung horizontally. Needless to say, the halves can also be pivoted vertically about the pin 173 to permit the other ends of the two halves to be swung upwardly. Vertical spaced bars 178 are disposed in parallelism at the rear of the two halves and one of these bars is rigidly attached to the plates 176 by welding or other appropriate means while the other plate is attached in spaced relationship with respect to the first by screws 179 extending through spacer washers 181 interposed between the two bars to provide a space in which the rear ends of the symmetrical halves of the hold-down device can operate in a common plane. In order further to hold the two halves to permit them to be swung apart in a common plane, a second pair of spaced transverse bars 183 are disposed forwardly of the column 159 and the uppermost of the bars is secured to the forward ends of the flanges 176 by means such as spot welding. The lowermost of the bars is held in spaced relationship with respect to the other by means of screws 184 extending through spacer washers 186 of a thickness to provide slots between the upper and lower bars in which the symmetrical halves of the hold-down device may be swung apart transversely.

At their forward extremities, the symmetrical halves of the hold-down device have notches 187 formed to provide an opening for the second of the columns or vertical rods 159. The halves of a split collar 188 are also secured in the notch formed slidably to fit about said collar. Handles for manual operation indicated at 189 are also secured to the forward ends of the two symmetrical halves so that the operator may spread the latter apart or may swing them up at will, and bring them down to flex the extremities of the bristle stock or may hold the latter down on the platform 156 as may be required.

The operations involved in assembling a brush of the type herein disclosed upon the apparatus will now be briefly described stage by stage.

As a preliminary operation before starting the fabrication of the laminations M, it is desirable that one of the annular end rings 37 be positioned upon the tubular core and the castellations 30 be bent over to retain it in position against the ends of the fins 21.

The stages involved in the assembling operation are illustrated diagrammatically in Figs. 11 through 21, inclusive.

In the several operations illustrated in Figs. 11 through 21, opposite ends of double bristles are bent, or folded outwardly to radial position successively and the mid portions or waists of the bristles are in effect, moved radially outwardly to engage the retaining rings 31 which as shown in the drawing is substantially larger in internal diameter than the bundle.

In accordance with the first step of the formation of a lamination as shown in Fig. 11, a brush core having the annular end ring 37 in position and being held in that position by castellations 30, is mounted over tube 72 and is seated upon pedestal 63 in the manner previously described and is clamped in that position by screwing the disc 79 down to engage the disc portion 23 of the bushing 22. The folder head structure 80 is also screwed upon the upper extremity of the tube 20 in the manner previously described. Platform 156 is disposed just below the upper ends of fins 21; the ram 131 with a bristle retaining ring 31 in position in the rabbet 132, is disposed slightly above the upper end of the deflector conoidal element 83.

In this stage, handles 134 of the tube 136 shown in Fig. 6, are positioned in slots 137 and the tube is tilted outwardly. After the tube is charged, it is swung back to vertical position, the hook element 142 being engaged in the opening therefor formed in the web 144 and the handles 134 are seated in the bottoms of slots 133.

Figure 12:
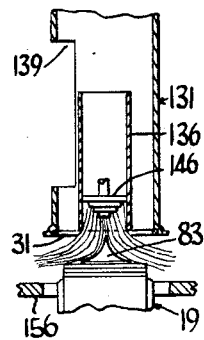

The auxiliary, or stock ram 146 is now operated as shown in Fig. 12 whereby partially, but not completely to expel the stock from the tube; in which operation the lower extremities of the bristles are deflected diagonally outwardly by the conoidal element 83. Any adjustments for irregularities of stock distribution can be made manually at this stage. The extreme upper tips of the brush bristles are still retained in the tube in vertical or very near vertical position.

Figure 13:
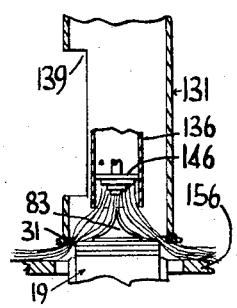

Stock ram 146 is now retracted and the ram 131 is subsequently actuated downwardly to the position indicated in Fig. 13 in which the mid portions of the bristles are pushed down over the side of the folder head 80 and the outer portions thereof are extended approximately radially outwardly and are held in that position upon the platform or table 156. It will be observed that the ring 31 is passed down over the unflared portion of stock and is pressed against the mid portion of the stock so that said portion is directed nearly vertically upwardly between the outer periphery of the deflector head and the ring. At this stage, it is obvious that substantially more than half of each bristle is outwardly flared. This is desirable, inasmuch as it permits the spreading of the stock from a compact bundle or bunch outwardly to form the annular brush section which is of relatively larger internal diameter than the original bunch or bundle, thus permitting it to be slipped over the core of the brush. The stock is then bent inwardly over the upper surface of the deflector or folder head in approximately an ogee curve. The extreme upper tips of the bristles are still retained in a compact bundle and in vertical position in the lower extremity of the stock tube 136.

The ring 31 is pressed down over the bundle so that the stock frictionally engages the inside, the ring thus holding the same and also causing the ring to assume circular outline. When ram 131 is lifted as hereinafter described, the ring is left correctly centered so that the bristles are flexed at their midpoints.

Figure 14:
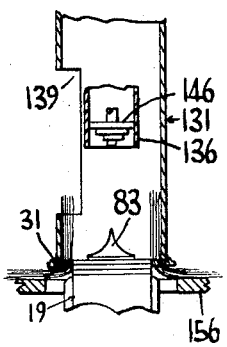

As represented in Fig. 14 of the drawings, the stock tube is elevated, as for example by lifting upon the projecting handles 134 whereby to release the upper tip portions of the stock, thus allowing the latter to spring upwardly and outwardly nearly to vertical position within the ram 131. The handles may be seated in notches 138 to hold the tube in elevated position.

As indicated in Fig. 15 of the drawings, the ram 131 is further slightly lowered sharply to flex the bristle stock between the ring and the upper extremity of the tube 20 at the same time bringing the ring 31 into engagement with the extreme upper and outer portions of the fins 21. In this operation, the table 156 is also pushed slightly downwardly. The upper halves of the bristles constituting the stock extends upwardly in vertical position between the outer periphery of the deflector or folder head 80 and the inner wall of the ram 131.

As disclosed in Fig. 16 of the drawings, the ram 131 is elevated out of the way, carrying the tube 136 with it but leaving the retaining ring 31 in the same position as in Fig. 15. The operation of folding over the upper extremities of the bristles in the lamination M is now initiated by operation of the deflector or folding ring 89 in the manner which has already been described in adequate detail. The folding action of the segmental ring 89 is sufficient to spring the upper ends of the bristles outwardly beyond the outer perimeter of the ram head 131.

Figure 17:
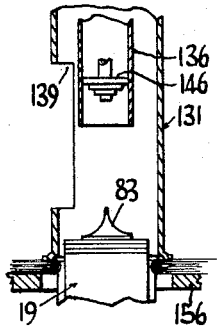

The head 131 is again lowered to the position indicated in Fig. 17 thus bending over the upper extremities of the bristles replicately upon the lower extremities. At the same time, the table or platform 57 is further slightly downwardly actuated a distance corresponding to one half the thickness of the lamination and further forcing the ring 31 down along the fins 21.

Figure 18:
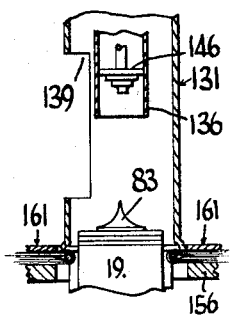

As indicated in Fig. 18, the split hold-down device 161 is operated to press the outer extremities of all of the bristles S in the lamination M, against platform 57, thus permitting the ram head 131 to be elevated to its initial position without allowing the upper extremities of the stock to spring back owing to their inherent resiliency.

Figure 19:
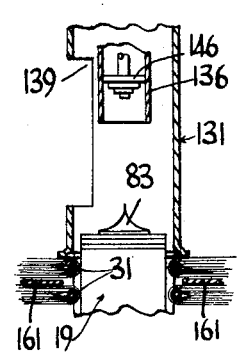
Figure 20:
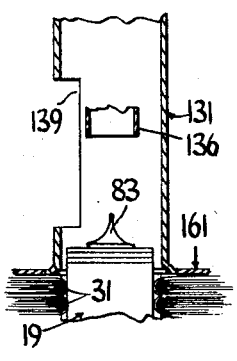

As indicated in Fig. 19 of the drawings, the operation of forming a laminate is repeated with the hold-down plates 162 and 163 in position to function as a platform to support the outer extremities of the bristles. The completed second lamination is shown in its finished position in Fig. 19. The upper half of the preceding lamination or section is now held down by the second lamination so that the split hold-down device 161 may be removed from the first lamination and placed in position upon the extremities of the bristles of the second lamination.

Succeeding laminations are assembled upon the first two, until the core is adequately filled as indicated in Fig. 21. In order to complete the assembly of the brush, the top annular end ring 38 is positioned upon the upper extremity of the tube 20 and seats upon the upper ends of the fins 21. The ring 38 may be held down with substantial pressure by means of the tubular ram 131 whereby to retain the several laminations in firmly compacted state upon the core 19. The deflector or folder head 80 is now unscrewed from the fitting 78 shown in Fig. 2 and may be lifted out through the opening 139 in the ram 131, thus exposing the castellations 30 so that they may be bent over or outwardly flared by means of a hammer or other tool operated through the opening. The end ring 38 is thus locked securely upon the tube 20 whereby to complete the assembly of a brush unit.

To remove the formed unit from the apparatus the lugs 67 may be released from groove 66, thus freeing the pedestal 63 and permitting the entire core supporting fixture and the unit to be lifted out. The nut 79 may then be removed and the brush lifted off tube 72.

It is also within the purview of the invention to raise the ram 131 a sufficient distance to permit the brush unit to be lifted from the pedestal 63 and a new core 19 to be inserted.

I claim:

1. In apparatus to form an annular rotary brush lamination from a bundle of parallel double ended brush bristles, a stock tube adapted to receive and hold said bundle of parallel double-ended brush bristles, a pointed element coaxially disposed with respect to the tube and against which an end of the bundle can be axially forced to flare outwardly the ends of the bristles thereof to a radial position, means to hold the outwardly flared ends in position and means to double the remaining ends of the bristles over upon the first mentioned ends.

2. In apparatus to form a cylindrical rotary brush having radially outwardly projecting bristles, means to hold the cylindrical core for said brush, a flaring device adapted to be disposed contiguous to one end of the core and having an approximately conical tip pointing axially away from the core, means to support a bundle of parallel double ended bristles in coaxial relationship with respect to the tip and to advance the adjacent end of the bundle toward the tip whereby the ends of the bristles at said end of the bundle are outwardly flared, means to hold the outwardly flared tips in position, means to dispose a retaining ring on the mid portions of the bristles and means to double over the remaining ends of the bristles upon the first mentioned ends and means to advance the lamination thus formed coaxially along the core.

3. In apparatus to form a cylindrical laminar brush having radially outwardly projecting bristles upon a substantially cylindrical core having radially projecting longitudinal fins, means to hold the core, means to form laminations at one end of said core comprising a head having an approximately conical flaring device secured to the head in coaxial relationship with respect to the core, means to support a bundle of parallel double ended bristles in coaxial relationship with respect to the core with one end of the bundle disposed contiguous to the point of said flaring device, means to actuate the bundle toward the point whereby the tips of the bristles at said end are outwardly flared, means to grip the outwardly flared ends, a segmental ring coaxially disposed about the head and means to actuate radially the segments of said ring, whereby outwardly partially to flare the remaining ends of the bristles and a cylindrical ram adapted to fit over the core for forcing the latter ends of the bristles down upon the first mentioned ends and for advancing the laminated thus formed along the core.

4. In apparatus for forming a cylindrical rotary brush comprising laminar sections disposed upon a cylindrical core, means for holding a core during the forming operation, a forming head adapted to be positioned at one end of said core, said head having a flaring device of approximately conical shape secured thereto with the tip thereof pointing axially away from the core, a tube for holding a bundle of axially disposed double ended bristles in coaxial relationship with respect to the core with one end of the bundle contiguous to the end of the flaring device, means to push the bundle through the tube whereby the tips of the bristles at said end are radially outwardly flared, means to hold the bristles in that position, means permitting the removal of the tube from the remaining ends of the bristles, and means for outwardly flaring the remaining ends of the bristles comprising a segmental ring coaxially disposed about said head and means to project radially outwardly the segments of the ring whereby to flex outwardly the last mentioned ends of the bristles and a tubular ram for forcing the last mentioned ends of the bristles down upon the first mentioned ends and for advancing the laminar units along the core.

5. In apparatus for forming a cylindrical rotary brush comprising laminar sections disposed upon a cylindrical core, means for holding a core during the forming operation, a forming head adapted to be positioned at one end of said core, said head having a bristle flaring device of approximately conical shape secured thereto with the tip thereof pointing axially away from the end of the core, a tube for holding a bundle of axially disposed double ended bristles in coaxial relationship with respect to the core with one end of the bundle contiguous to the end of the flaring device, means to push the bundle through the tube and against the flaring device whereby the tips of the bristles at said end are radially outwardly flared, means to hold the bristles in that position, means permitting the removal of the tube from the remaining ends of the bristles and means for outwardly flaring the remaining ends of the bristles comprising a segmental ring associated with said head and means to project radially outwardly the segments of the ring whereby to flex outwardly the last mentioned ends of the bristles and a tubular ram for forcing the last mentioned ends of the bristles down upon the first mentioned ends and for advancing the laminar units along the core, said ram being provided with means for holding a retaining ring in position to be disposed upon the mid portions of the bristles when it is pressed against the mid portions of the bristles.

6. Apparatus for forming a cylindrical rotary brush comprising laminar sections disposed upon a cylindrical core, said apparatus comprising means for holding a core for said brush during the forming operation, a forming head adapted to be positioned at one end of said core, said head having a flaring device of approximately conical shape secured thereto with the tip thereof pointing axially away from the core, a tube for holding a bundle of double ended bristles in coaxial relationship with respect to the core with one end of the bundle contiguous to the end of the flaring device, means to push the bundle partially through the tube whereby the tips of the bristles at said end are radially outwardly flared, means to hold the flared portions of the bristles in that position, means permitting removal of the tube from the remaining ends of the bristles, means for initiating outward flaring of the remaining ends of the bristles and a tubular ram engaging the partially outwardly flared portions of the bristles forcing them down upon the first mentioned ends and for advancing the laminar units along the core.

7. Apparatus for forming a cylindrical rotary brush unit comprising means for holding a brush core during the forming operation, a forming head adapted to be positioned at one end of said core, said head having a flaring device of approximately conical shape secured thereto with the tip thereof pointing axially away from the core, a stock tube for holding a bundle of double ended bristles in coaxial relationship with respect to the core with one end of the bundle contiguous to the end of the flaring device, means to push the bundle partially through the tube whereby the tips of the bristles at said end are radially outwardly flared, means for holding the outwardly flared portions in that position and comprising a pair of split collar sections adapted to press upon the upper faces of the outwardly flared portions of the bristles to permit removal of the tube from the remaining ends of the bristles, means for initiating outward flaring of said remaining ends of the bristles and a tubular ram adapted to engage the end portions in which flaring has been initiated and to press them down upon the initially flared portions and for forcing the bristles upon the core, said split collar being removable when said remaining ends of the bristles have been secured.

8. In a method of forming a rotary brush comprising a plurality of superposed laminations, disposed upon a common core, the steps of disposing a table element having an opening formed therein greater than the cross section of the core, contiguous to one end of the core and with the opening in coaxial alignment with the core, distributing double ended, replicately folded bristles radially around the core with a retaining ring in the fold thereof, whereby to provide a lamination, said lamination lying directly upon the table element holding all of the ends of the bristles upon the table, providing a second lamination similar to the first and being disposed directly upon the first, whereby to hold the bristles of the first in folded position, repeating the operation until a desired number of laminations have been assembled in coaxial relationship and being pressed against each other, the table element and the laminations being moved stepwise toward the opposite end of the core as each lamination is positioned upon the table, the bristles being maintained in folded state by mutual pressure between contiguous units.

9. In a method of forming an annular rotary brush lamination, the steps of radially outwardly bending the tips of the bristles at one end of a bunch of parallel bristles from the axis of the bunch to such degree as to bring the tips substantially to their final outward position in the lamination while retaining the ends of the bristles at the other end of the bunch from radial displacement, more than half of each bristle being displaced, placing a retaining ring of substantially larger internal diameter than the bundle around the undisplaced portion of stock and in position upon the mid portion of the outwardly flared portion and doubling over the remaining ends of the bristles on the first ends.

10. In a method of forming a rotary brush lamination, the steps of radially outwardly bending the tips of the bristles at one end of a bunch of parallel bristles from the axis of the bunch to such degree as to bring the tips thereof substantially to their final outward position in the lamination while retaining the ends of the bristles at the other end of the bunch from radial displacement, more than half of each bristle being displaced, placing a retaining ring of substantially larger diameter than the bundle in position on the outwardly flared portion, the mid portions of the bristles being flexed to vertical position within the ring and doubling over the remaining ends of the bristles on the first end.

11. In a method of forming a cylindrical rotary brush, the steps of forming a laminate by radially, outwardly bending the tips of the bristles in a bunch of parallel bristles at one end of the bunch substantially to their final outward displacement while retaining the remaining ends from displacement, more than half of each bristle being displaced, disposing a retaining ring about the undisplaced portions of the bristles and resting it upon the outwardly bent portions, outwardly folding the remaining ends of the bristles upon the first mentioned end, pushing the laminate thus formed onto a brush core and repeating the operation until the core is appropriately filled with laminations in which the bristles of one lamination are in contact with the adjacent bristles of the contiguous lamination throughout their lengths.

12. In a method of forming a rotary brush comprising a cylindrical core having peripherally spaced, radially projecting longitudinal fins formed thereon, a retaining ring seated on the fins and double ended bristles looped about each ring to provide a lamination, the outer bristles of each lamination being in contact substantially from looped portion to tip with the corresponding bristles in contiguous lamination, the steps of radially outwardly bending the tips of the bristles at one end of a bundle of parallel bristles from the axis of the bundle to a position substantially corresponding to their outward final position while retaining the ends of the bristles at the other end of the bunch from radial displacement, more than half of each bristle being displaced, placing a retaining ring over the undisplaced portion and resting the same upon the mid portion of the outwardly flared portions of the bristles doubling over the remaining ends of the bristles upon the first mentioned ends, holding the first and second mentioned ends of the bristles in position, forcing the laminations thus formed partially down upon the core, forming a second lamination upon the first mentioned lamination by a series of steps corresponding to those involved in forming the first mentioned lamination and repeating the operation of forming laminations until the core is filled and securing an annular ring upon the ends of the core to retain the laminations in position.

13. Apparatus for forming a rotary cylindrical brush, said brush comprising a plurality of disc-like laminations upon a substantially cylindrical core adapted to hold said laminations, said apparatus comprising a fixture for holding the core, means coaxially to hold an end of a bunch of double ended bristles without radial displacement and with the other end thereof contiguous to the end of the core, means axially to advance the bunch toward the core, means disposable at an end of the core to bend radially outwardly the bristle ends in a bunch of bristles as it is advanced, substantially to their final radial position in a lamination of the brush, means to position a retaining ring over the undisplaced portions of the bunch and on the mid-portions of the bristles, means to double over the remaining ends of the bristles upon the first mentioned ends and means to advance a lamination thus formed upon the core.

References Cited in the file of this patent

UNITED STATES PATENTS

| | | |
|---|---|---|
| 656,374 | Robinson | Aug. 21, 1900 |
| 912,051 | Abbot | Feb. 9, 1909 |
| 1,072,326 | Gaudron | Sept. 2, 1913 |
| 1,339,894 | Johnson | May 11, 1920 |
| 2,658,802 | Stahel | Nov. 10, 1953 |
| 2,740,148 | Nelson | Apr. 3, 1956 |